J. W. BODMAN.
DISTILLATION OF FATTY ACIDS.
APPLICATION FILED AUG. 9, 1919.
1,372,477.
Patented Mar. 22, 1921.
2 SHEETS—SHEET 2.
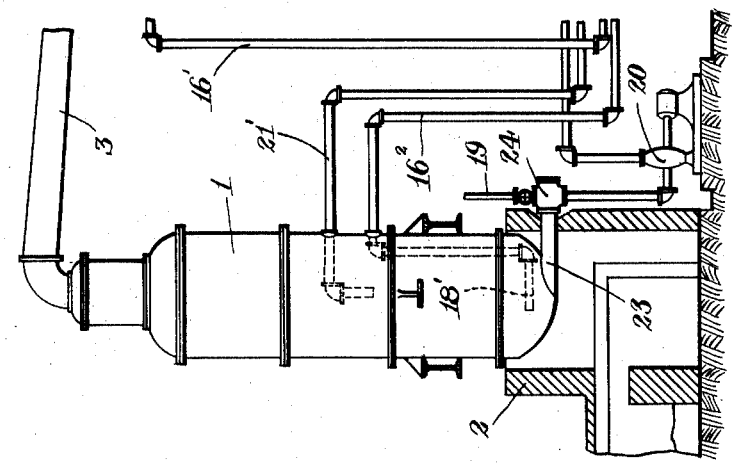
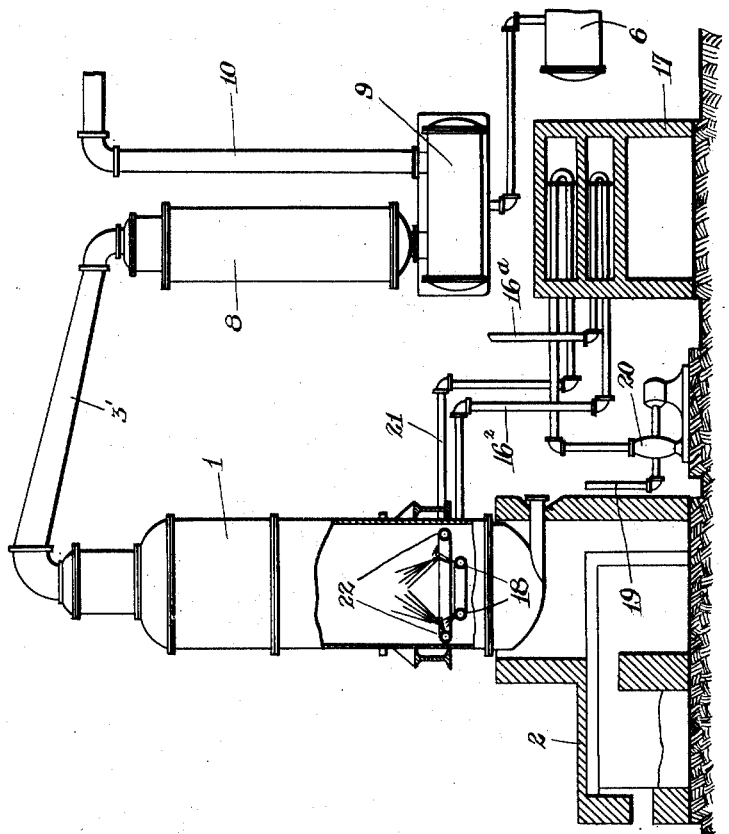

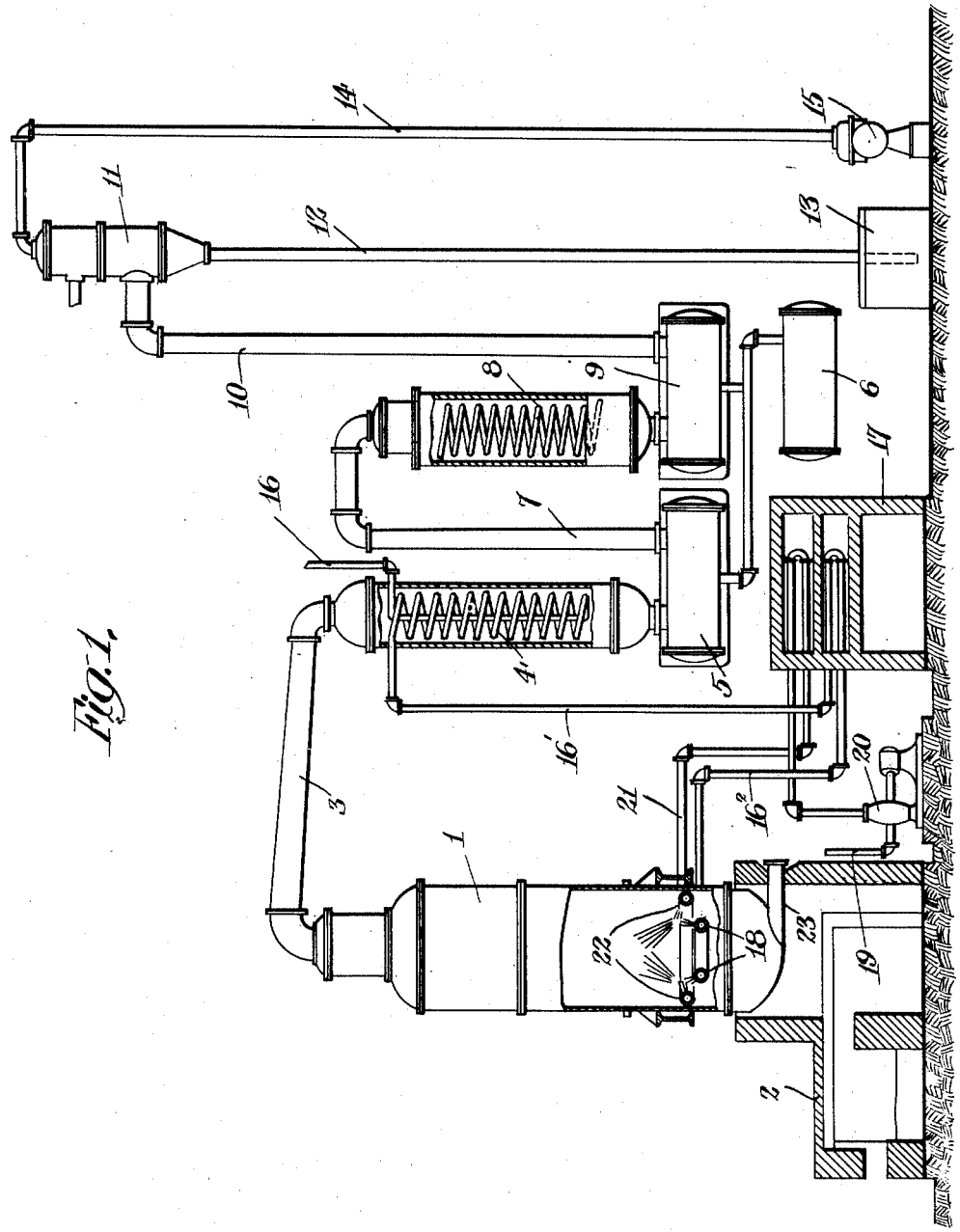

UNITED STATES PATENT OFFICE.

JOHN W. BODMAN, OF WESTERN SPRINGS, ILLINOIS, ASSIGNOR TO WILLIAM GARRIGUE & COMPANY, INC., OF NEW YORK, N. Y., A CORPORATION OF NEW YORK.

DISTILLATION OF FATTY ACIDS.

1,372,477.      Specification of Letters Patent.      Patented Mar. 22, 1921.

Application filed August 9, 1919. Serial No. 316,301.

*To all whom it may concern:*

Be it known that I, JOHN W. BODMAN, a citizen of the United States, residing at Western Springs, in the county of Cook and State of Illinois, have invented certain new and useful Improvements in Distillation of Fatty Acids, of which the following is a specification.

My invention relates to a process of purifying fatty acids by the distillation of the same and suitable apparatus in which the process may be carried out. By the improved process all of the fatty acids subjected to treatment are distilled in an effective and economical manner with the production of a purified product. The objects of my invention are to provide improved process steps and improved arrangements and combinations of apparatus by which the process may effectively be practised.

The invention comprises the use of several improved features which may be used separately, or, for the best effect conjointly. One of these features relates to the introduction of the fatty acid into a still, in a vacuum distillation apparatus, in the form of spray. The sprayed material, which has been preheated, mingles intimately within the still with superheated steam or other gaseous carrier with the result that a thorough and speedy evaporation of the material takes place. Another feature of the invention consists in the utilization of the latent heat of the evaporated fatty acids to preheat the steam or other gaseous carrier. Thus the vapors from the still may be caused to pass over a coil of pipe through which the gaseous carrier passes on its way to the still, some of the vapors being condensed and the steam or other gaseous carrier being correspondingly heated. It will of course, be understood that the latent heat of the vaporized material, that is, the heat which is released when the substance changes from the vaporous to the liquid state is considerable. In the preferred form of the invention the spraying of the fatty acids and the utilization of the latent heat of the vaporized fatty acids are both made use of to obtain the desired result in the quickest and most economical manner.

The process is particularly applicable in the soap and stearic acid industries for the production of light colored fatty acids from refinery "foots," etc., which are too dark colored for direct employment in soap making. I have found that the process briefly described above results in a more complete distillation of the dark fatty acids than was previously possible, resulting in considerable elimination of color and odor, with the maximum yield of fatty acids and the minimum yield of pitch.

In order that my invention may be more clearly understood, attention is hereby directed to the accompanying drawings forming part of this application, and illustrating certain forms of apparatus by which my process may be carried out. In the drawings, Figure 1 represents a diagrammatic side elevation of an installation in which the gaseous carrier is preheated by the utilization of the latent heat of the evaporated fatty acid and the fatty acids are sprayed in the still together with the gaseous carrier, certain parts being shown in cross section; Fig. 2 is a partial view of a similar apparatus in which the preheating of the gaseous carrier by the latent heat of the vaporized material is not utilized; and Fig. 3 is a similar partial view of apparatus in which the spraying feature of the invention is omitted.

Referring first to Fig. 1 of the drawings, the still 1 is preferably mounted over and heated from a furnace 2. A connection 3 extends from the top of the still to the top of what I term a superheater condenser 4 which is connected at its bottom to a receiver 5, the latter being connected in usual fashion to an egg 6.

The receiver 5 is also connected by pipe 7 to a condenser 8 which is connected at its bottom to a receiver 9 which is also connected to the egg 6. A vertical connection 10 extends from the receiver 9 to the barometric condenser 11 which is connected by the water leg 12 to the hot well 13, and connection 14 also extending from the barometric condenser 11 to the vacuum pump 15. In the form of my invention illustrated in Fig. 1, the steam or other gaseous carrier to be used enters the system through a pipe 16 which extends into the superheater condenser 4. This pipe extends through the superheater condenser in a suitable coil, and then extends from the superheater condenser by a pipe 16' which carries the gaseous carrier through a furnace 17. The steam or other gaseous carrier is superheated, or heated to a considerable degree by its passage through the coil in the superheater condenser, because of the passage of the hot vapors from the still over the coils in the superheater condenser. The gaseous carrier is still further heated by the furnace 17, if the pipe 16' is caused to extend through the same from condenser 4, the gaseous carrier passing by a connection 16² into the lower part of the still, where it escapes through nozzles or vents 18.

The fatty acids to be distilled enter through a pipe 19 and are forced by a pump 20 through a coil of pipe mounted in the furnace 17 from which point the heated fatty acids pass through pipe connection 21 into the still. Here they pass through nozzles 22 in the form of spray. These nozzles are arranged in such a manner that the sprayed fatty acids and the gaseous carrier are thoroughly and intimately mingled together. The heat conditions are so arranged as to cause the evaporation of the sprayed fatty acids, a temperature of about 450° F. being required. Preferably, the steam or gaseous carrier nozzles 18 are arranged immediately beneath the fatty acid nozzles 22. A tar outlet 23 is provided at the bottom of the still.

In the operation of the process a portion of the evaporated fatty acids passing over the pipe coil in the superheater condenser is condensed thereby, and an amount of heat equal to the latent heat of the fatty acids and steam condensed is imparted to the steam within the coil. Whatever fatty acids are not condensed within condenser 4 will be condensed within the cooler condenser 8.

In Fig. 2 I have illustrated the same installation with the omission of the superheater condenser 4. In this case the still 1 has a connection 3' extending directly from the top of the same to the cooler condenser 8, which is connected to the receiver 9, which latter is connected directly by pipe 10 with the barometric condenser 11 shown in Fig. 1. In this case the steam or other gaseous carrier enters the furnace 17 directly through a pipe 16ᵃ, the gaseous carrier thence passing through the connection 16² as in the first case to the nozzles 18 within the still. The fatty acids pass through pump 20 and connection 21 to the nozzles 22 within the still, the same as in the former case. With this installation it will, of course, be necessary to provide a sufficient heating effect by the furnaces 2 and 17 to produce the distilling temperature within still 1.

In Fig. 3 I have indicated the arrangement which may be used when the superheater condenser is used, but the fatty acids are not sprayed into the still. This figure, as well as Fig. 2, should be read in connection with Fig. 1 to show the omitted portions. In Fig. 3 the heated fatty acids pass from the furnace 17, as shown in Fig. 1, through a pipe connection 21' which may be the same as the pipe 21 shown in Fig. 1 except that it does not terminate in the nozzles 22. In the arrangement of Fig. 3 the fatty acids merely flow from the end of pipe 21' into the still to form a body of liquid in the still through which the gaseous carrier bubbles up. The gaseous carrier passes from its coil within furnace 17 through pipe connection 16² into the still whence it issues through nozzles or openings indicated at 18' near the bottom of the still and within the mass of liquid fatty acids. The evaporated fatty acids mingled with the gaseous carrier pass through connection 3 into the superheater condenser 4, the steam or other gaseous carrier passing through the coil in the superheater condenser and thence proceeding through connection 16' to the furnace 17, all of the remainder of this installation preferably being the same as that shown in Fig. 1.

In this figure the tar outlet 23 is shown connected by a T-connection 24 with the pipe 19 by which the fatty acids are led to the pump 20. Similar connections may, of course, be used in all of the installations, so that any fatty acids which have not been distilled in the first operation may be passed through the system again.

It will be understood that the steam or other gaseous carrier which has been heated in the superheater condenser 4, as described herein, need not in all cases additionally pass through a further heating device such as the furnace 17, since with some types of fatty acids the superheat obtained from superheater condenser 4 will be sufficient, the steam in this case passing directly from superheater condenser 4 to the still.

What I claim is:—

1. A process of distilling fatty acids to remove dark color therefrom, which comprises bringing them, in the form of spray, only, into contact with a gaseous carrier, in a vacuum, under heat conditions suitable for the complete distillation of the fatty acids, and condensing the evaporated fatty acids.

2. A process of distilling fatty acids, which comprises subjecting them, in a vacuum, to the action of a heated gaseous carrier, and causing the evaporated fatty acids and carrier mingled therewith to impart some of their heat to the gaseous carrier which is about to act upon the undistilled fatty acids, in a continuous process.

3. A process of distilling fatty acids, which comprises subjecting them, in a vacuum, to the action of a heated gaseous carrier, and causing the evaporated fatty acids and carrier mingled therewith to pass over coils of pipe through which the gaseous carrier passes on its way to act upon the undistilled fatty acids, and thereby to condense, at least in part, and impart heat to the gaseous carrier within the coils.

4. A process of distilling fatty acids, which comprises bringing heated fatty acids, in the form of spray, into contact with a heated gaseous carrier, the heat conditions being so arranged as to be suitable for the distillation of the fatty acids, and causing the evaporated fatty acids and carrier mingled therewith to pass over coils of pipe through which the gaseous carrier passes on its way to act upon the undistilled fatty acids, and thereby to condense, at least in part, and impart heat to the gaseous carrier within the coils.

This specification signed and witnessed this 5th day of Aug., 1919.

JOHN W. BODMAN.

Witnesses:
  WM. L. SCHULTZ,
  WM. A. NELSON.